United States Patent [19]

Buckholtz et al.

[11] Patent Number: 5,425,856
[45] Date of Patent: Jun. 20, 1995

[54] METHOD OF MAKING ALKALI METAL ALCOHOLATES

[75] Inventors: Harry E. Buckholtz, Lewiston; Tilak V. Bommaraju, Grand Island, both of N.Y.

[73] Assignee: Occidental Chemical Corporation, Niagara Falls, N.Y.

[21] Appl. No.: 233,577

[22] Filed: Apr. 26, 1994

[51] Int. Cl.⁶ ................................................ C25B 3/00
[52] U.S. Cl. ..................................................... 204/72
[58] Field of Search ................... 204/59 R, 59 QM, 72

[56] References Cited

FOREIGN PATENT DOCUMENTS 0146771 7/1985 European Pat. Off. .
3346131 6/1985 Germany .

OTHER PUBLICATIONS

Hamann et al., Transport and conversion processes in the direct electrochmeical synthesis of alcoholates with Nafion membranes, Chem–Ing–Tech, 64(7), 648–9, 1992.

*Primary Examiner*—John Niebling
*Assistant Examiner*—Edna Wong
*Attorney, Agent, or Firm*—Wayne A. Jones; Richard D. Fuerle

[57] ABSTRACT

Disclosed is a method of making an alkali metal alcoholate by performing the reaction $$MCl + ROH \xrightarrow{D.C.} RO^- + M^+ + \tfrac{1}{2}Cl_2 + \tfrac{1}{2}H_2$$

where M is sodium or potassium, ROH is methanol, ethanol, propanol, or butanol, and D.C. is direct current. The process can be used to make sodium methylate in a modified Hybinette cell having a separator in between a cathode compartment and an anode compartment. The cell is filled with methanol and a solution of sodium chloride in methanol is added to the cathode compartment. When direct current is passed between the cathode and the anode, a solution of sodium methylate in methanol collects in the anode compartment. The solution of sodium methylate can be continuously removed and cooled to separate any sodium chloride in it which can be recycled back to the cathode compartment. Alternatively, the sodium chloride can be added to the anode compartment while an inert salt is added to the cathode compartment. The process can also be performed in a three-compartment cell.

13 Claims, 3 Drawing Sheets

METHOD OF MAKING ALKALI METAL ALCOHOLATES

BACKGROUND OF THE INVENTION

This invention relates to a method of making alkali metal alcoholates by reacting an alkali metal chloride with an alcohol under the influence of direct current. In particular, it relates to a method of making sodium methylate in an electrolytic cell from sodium chloride and methanol.

Sodium methylate is an intermediate in the production of certain pharmaceuticals. Presently, it is made from sodium amalgam in a mercury cell where mercury is the cathode and the electrolyte is sodium chloride. However, this process can result in the contamination of the product and the environment with mercury.

Sodium methylate can also be made by reacting metallic sodium with methanol. This reaction, however, is difficult to control and can be extremely violent and occasionally even explosive.

SUMMARY OF THE INVENTION

We have discovered that sodium methylate and other alkali metal alcoholates can be made by reacting an alkali metal chloride with an alcohol under the influence of direct current. Unlike prior processes for producing alcoholates, the process of this invention is environmentally acceptable and produces no mercury contaminated products. It also uses less energy than the prior processes do.

DESCRIPTION OF THE PREFERRED EMBODIMENTS

In the process of this invention, an alkali metal chloride is reacted with an alcohol under the influence of direct current (D.C.) to produce an alkali metal alcoholate according to the equation:

$$MCl + ROH \xrightarrow{D.C.} RO^- + M^+ + \tfrac{1}{2}Cl_2 + \tfrac{1}{2}H_2$$

where M is sodium, potassium, or mixtures thereof and ROH is straight chain alkanol from $C_1$ to $C_4$ such as methanol, ethanol, n-propanol, or n-butanol. The preferred alkali metal chloride is sodium chloride and the preferred alcohol is methanol because sodium methylate is the most important alkali metal alcoholate. The reaction is preferably conducted at about 60° to about 80° C. as that is believed to be the most efficient temperature range, but higher and lower temperature ranges can also be used. Although unsaturated solutions can be used, it is preferable to use a saturated solution of the alkali metal chloride in the alcohol for greatest efficiency. The process can be performed in a batch or a continuous manner; continuous processes are preferred as they are more efficient. Approximately 1 Faraday of direct current is required per mole of alkali metal alcoholate that is produced.

Figure 1:
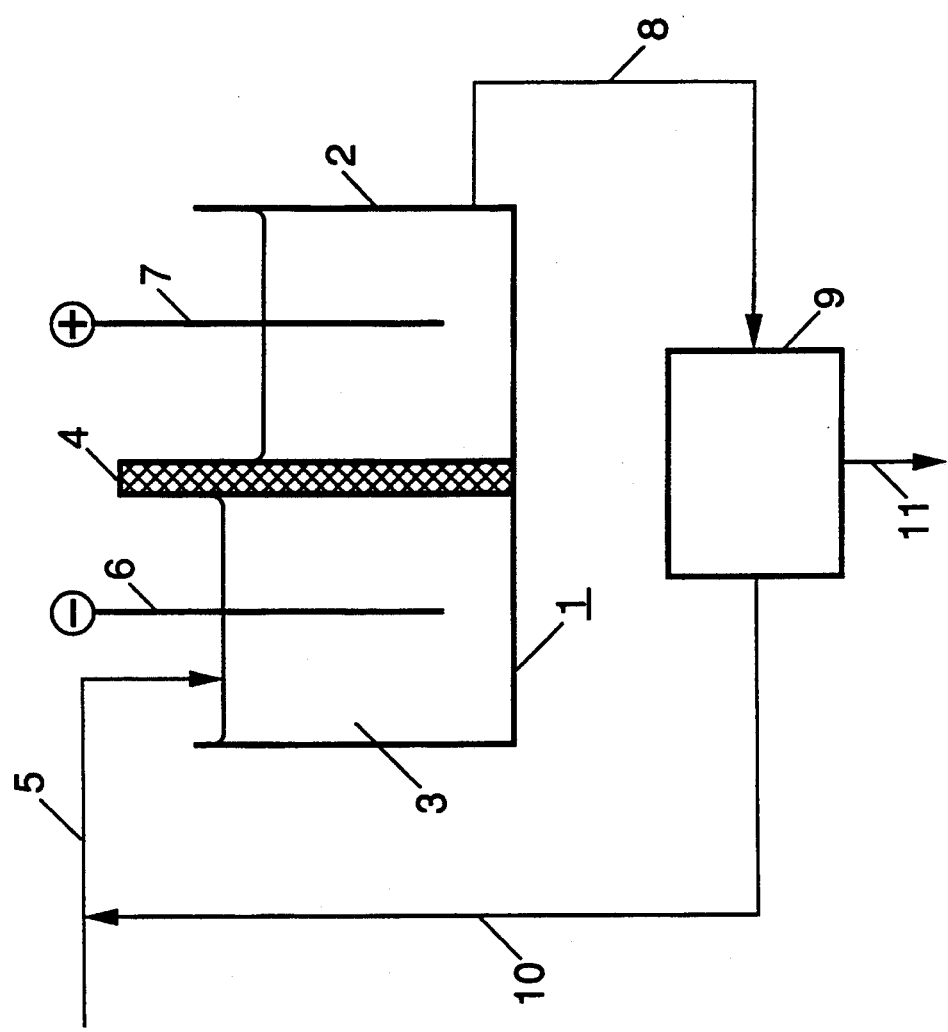
FIG. 1 is a diagram illustrating a certain presently preferred process for producing alkali metal alcoholates according to this invention.

Referring now to FIG. 1, a modified Hybinette cell 1 has an anode compartment 2 separated from a cathode compartment 3 by a separator 4. Examples of suitable separators include porous polytetrafluoroethylene (PTFE) and Polyramix®, a zirconia-PTFE separator sold by OxyTech Systems, Inc. A solution of an alkali metal salt in an alcohol is continuously added through line 5 to cathode compartment 3. A direct current is passed between cathode 6 and anode 7 resulting in the formation of an alkali metal alcoholate which passes through separator 4 along with the alcohol and some of the alkali metal salt. The solution in cathode compartment 3 is kept at a higher level than the solution in anode compartment 2 to prevent backflowing from anode compartment 2 into cathode compartment 3. Solution from anode compartment 2 is continuously moved through line 8 to crystallizer 9. In crystallizer 9 it is cooled, which results in the precipitation of the alkali metal chloride. The alkali metal chloride is separated from the remaining solution and leaves crystallizer 9 through line 10 while the remaining solution of the alkali metal alcoholate in the alcohol leaves through line 11 and is sold as the product. The salt in line 10 can be recycled back to cell 1 through line 5.

Figure 2:
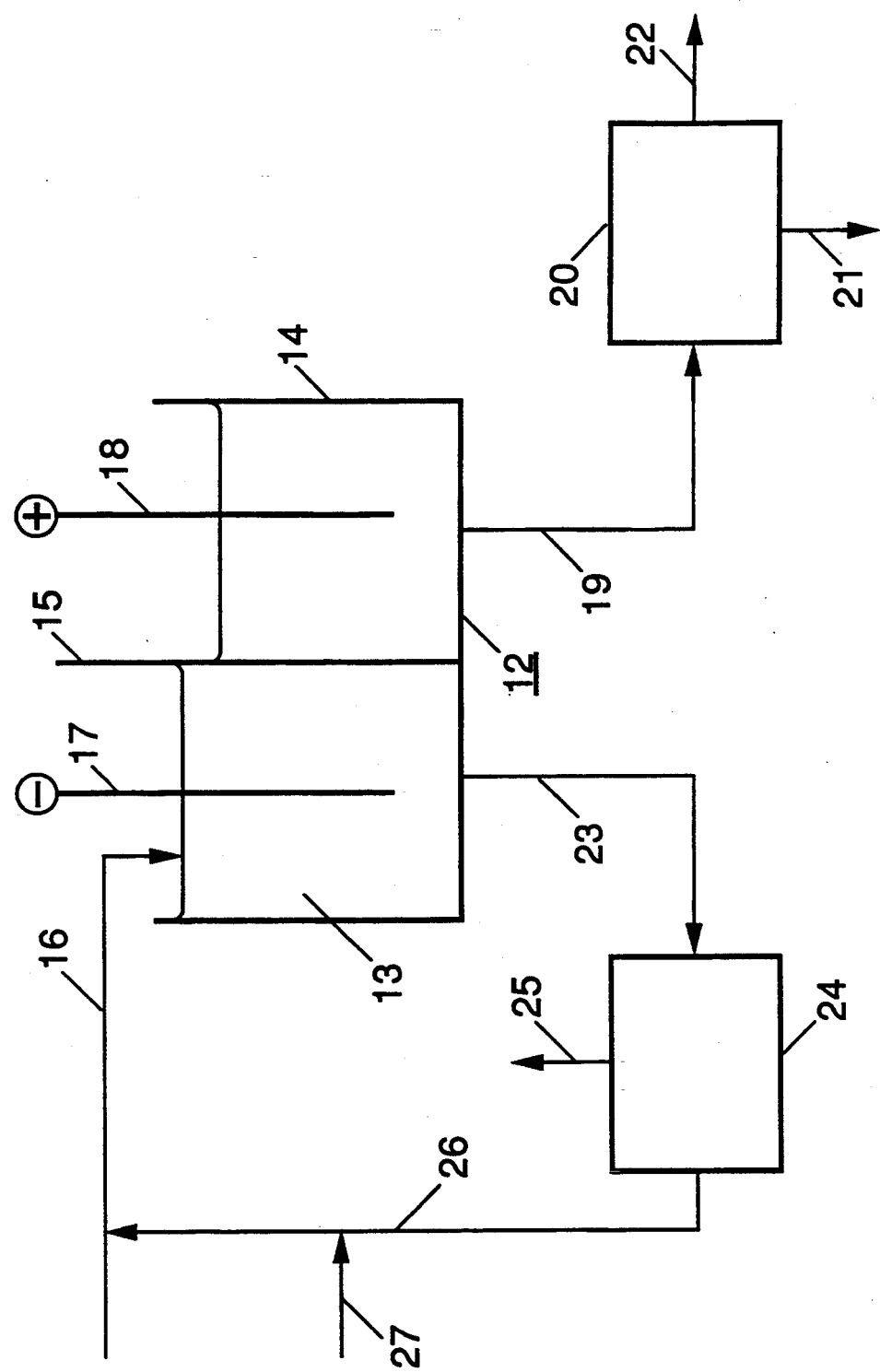
FIG. 2 is a diagram of a certain presently preferred alternative process for producing alkali metal alcoholates according to this invention.

In FIG. 2, the same reaction occurs in an electrolytic cell 12 which has an cathode compartment 13 and a anode compartment 14 separated by cationic ion exchange membrane 15. Examples of suitable cationic ion exchange membranes include DuPont's Nafion Series 200, 300, or 900 membranes or the carboxylic acid membranes of Asahi Chemical and Asahi Glass. Also, the solution of the alkali metal chloride in the alcohol is now added from line 16 to cathode compartment 13. Direct current is again applied between cathode 17 and anode 18, which results in the formation of the alkali metal alcoholate in anode compartment 14. In order to increase the conductivity of the cell, a small amount of an inert salt is added to anode compartment 14, as is known in the art. Examples of inert salts that can be used include the perchlorate and sulfate of the alkali metal used in the process. The alkali metal alcoholate solution is removed from anode compartment 14 through line 19 and is sent to crystallizer 20, which cools the solution to precipitate out the inert salt. The inert salt is separated from the rest of the solution and leaves crystallizer 20 through line 21 while the product solution leaves through line 22. Solution is also removed from cathode compartment 13 through line 23 where it is sent to dechlorinator 24 which removes chlorine gas through line 25. The alcohol, which leaves dechlorinator 24 through line 26, is then mixed with additional alkali metal salt from line 27 and is recycled to cathode compartment 13 through line 16.

Figure 3:
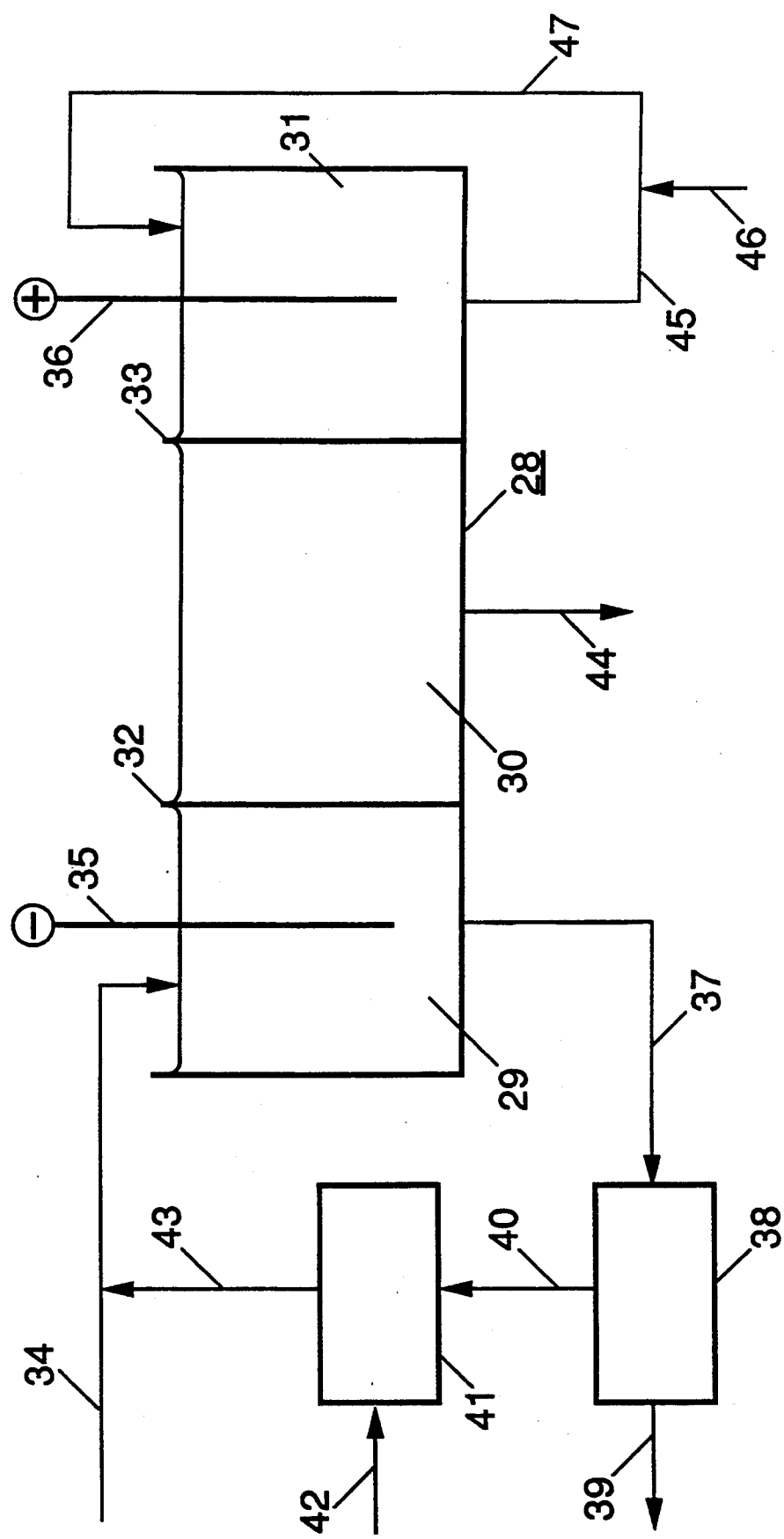
FIG. 3 is a diagram of yet another certain presently preferred alternative process for producing alkali metal alcoholates according to this invention.

In FIG. 3 the same reaction occurs in a three-compartment electrolytic cell 28 which has cathode compartment 29, buffer compartment 30, and anode compartment 31. Cathode compartment 29 and buffer compartment 30 are separated by cation exchange membrane 32, and anode compartment 31 is separated from buffer compartment 30 by anion exchange membrane 33. Examples of suitable anionic exchange membranes include AMV membranes of Asahi Glass, AM-1, AM-2, and AM-3 membranes of Tokuyoma Soda, or the strong base membranes of Ionics. A mixture of alcohol and alkali metal chloride is added in line 34 to cathode compartment 29. Alcohol is added to buffer compartment 30 and alcohol and a small amount of a conducting salt, which can be the product alkali metal alcoholate, is added to anode compartment 31. Direct current is applied between cathode 35 and anode 36 which results in the formation of the alkali metal alcoholate in the cell. Fluid from cathode compartment 29 is removed through line 37 where it enters dechlorinator 38. Chlorine gas is removed through line 39 and the remaining fluid, depleted in alkali metal chloride, passes through line 40 to mixer 41. Alkali metal chloride is added through line 42 and the resulting mixture of alkali metal chloride and methanol passes through line 43 back into line 34. The product, a mixture of alcohol and typically about 10 to about 15% alkali metal alcoholate, is removed through line 44. Fluid from anode compartment 31 is taken through line 45. A conducting salt and/or the solvent is added to line 46 and the fluid is returned to the anode compartment 31 by line 47.

The following examples further illustrate this invention.

EXAMPLE

Using apparatus as shown in FIG. 1, a saturated solution of sodium chloride in methanol at about 60° C. was fed into the anode compartment of a laboratory cell containing a $RuO_2+TiO_2$ coated Ti anode and a steel cathode separated by a porous polytetrafluoroethylene separator. Electrolysis was performed at a current density of 1 amp/sq. inch over a period of 6 hours. The electrolyte was removed in such a way that the anolyte was maintained at least 1 to 2 inches higher than the catholyte. The electrolyte from the cathode compartment was cooled to crystallize the salt which was recycled back to the cell feed after saturating it with methanol. The effluent from the crystallizer contained 10 to 15 wt. % sodium methylate.

We claim:

1. A method of continuously making an alkali metal alcoholate comprising performing the reaction

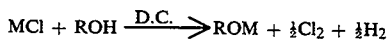

in a three compartment electrolytic cell having an anode in an anode compartment which is separated from a buffer compartment by an anionic exchange membrane and a cathode in a cathode compartment which is separated from said buffer compartment by a cationic exchange membrane by (A) continuously adding a mixture of said ROH and said MCl to said cathode compartment;
(B) continuously adding ROH to said buffer compartment;
(C) continuously adding ROH and a small amount of a conducting salt to said anode compartment;
(D) continuously direct current between said anode and said cathode; and
(E) continuously drawing said ROM product from said buffer compartment, where M is selected from the group consisting of sodium, potassium, and mixtures thereof, R is straight chain alkyl from $C_1$ to $C_4$, and D.C. is direct current.

2. A method according to claim 1 wherein M is sodium and R is methyl.

3. A method according to claim 1 wherein said reaction is performed at a temperature of about 60° to about 80° C.

4. A method according to claim 1 wherein said MCl+ROH is a saturated solution of MCl in ROH.

5. A method of making sodium or potassium alcoholate in a three-compartment electrolytic cell having an anode compartment, a cathode compartment, and a buffer compartment in between said anode compartment and said cathode compartment, where said anode compartment is separated from said buffer compartment by a anionic ion exchange membrane and said cathode compartment is separated from said buffer compartment by a cationic ion exchange membrane comprising (A) filling said cell with a fluid which comprises an alcohol selected from straight chain alkanols from $C_1$ to $C_4$;
(B) continuously adding sodium chloride or potassium chloride to said cathode compartment, forming a solution thereof therein;
(C) passing direct current between said cathode and anode compartments, whereby a solution of sodium or potassium alcoholate collects in said buffer compartment;
(D) continuously removing said solution of sodium or potassium alcoholate from said buffer compartment; and
(E) removing solution from said cathode compartment, dechlorinating said removed solution, adding sodium chloride or potassium chloride to said removed solution, and returning said removed solution to said cathode compartment.

6. A method according to claim 5 wherein sodium chloride and methanol are used to make sodium methylate.

7. A method according to claim 5 wherein an inert salt is continuously added to said anode compartment.

8. A method according to claim 5 wherein said solution of sodium chloride or potassium chloride is saturated.

9. A method according to claim 1 wherein M is potassium and R is methyl.

10. A method according to claim 1 wherein fluid is continuously removed from said cathode compartment and is dechlorinated, mixed with MCl, and returned to said anode compartment.

11. A method according to claim 1 wherein an inert salt is added to said anode compartment.

12. A method according to claim 5 wherein said cell is operated at a temperature of about 60° to about 80° C.

13. A method according to claim 5 wherein potassium chloride and methanol are used to prepare potassium methylate.

* * * * *